(12) United States Patent
Britton et al.

(10) Patent No.: US 7,646,329 B2
(45) Date of Patent: Jan. 12, 2010

(54) METHOD FOR DETECTING A TARGET

(75) Inventors: Adrian Britton, Malvern (GB); Michael Andrew Evans, Malvern (GB); Carol Anne Evans, legal representative, Malvern (GB); Adrian Thomas Shalley, Malvern (GB); Samantha Jane Lycett, Malvern (GB); Iain Baird Smith, East Lothian (GB)

(73) Assignee: Qinetiq Limited (GB)

( * ) Notice: Subject to any disclaimer, the term of this patent is extended or adjusted under 35 U.S.C. 154(b) by 436 days.

(21) Appl. No.: 11/658,905

(22) PCT Filed: Aug. 2, 2005

(86) PCT No.: PCT/GB2005/003022

§ 371 (c)(1),
(2), (4) Date: Jan. 30, 2007

(87) PCT Pub. No.: WO2006/013347

PCT Pub. Date: Feb. 9, 2006

(65) Prior Publication Data

US 2009/0231180 A1    Sep. 17, 2009

(30) Foreign Application Priority Data

Aug. 6, 2004    (GB) .................................. 0417518.8

(51) Int. Cl.
*G01S 13/62* (2006.01)
(52) U.S. Cl. ............................. 342/28; 342/52; 342/54; 342/55; 342/93; 342/179; 342/197

(58) Field of Classification Search ................... 342/28, 342/52–55, 91–97, 179, 195, 197
See application file for complete search history.

(56) References Cited

U.S. PATENT DOCUMENTS 4,395,924 A    8/1983    Callahan (Continued)

FOREIGN PATENT DOCUMENTS

CA    2639441 A1 *   3/2009

(Continued)

OTHER PUBLICATIONS

Quen-Zhong Wu et al., "Motion Detection baed on Two-Piece Linear Approximation for Cumulative Histograms of Ratio Images in Intelligent Transportation Systems" Proceedings of 2004 IEEE, International Conference on Networking, Sensing & Control, pp. 309-314, (Mar. 21, 2004).

(Continued)

*Primary Examiner*—John B Sotomayor
(74) *Attorney, Agent, or Firm*—McDonnell Boehnen Hulbert & Berghoff LLP

(57) ABSTRACT

A method of detecting a target in a scene comprises the steps of generating a comparison of the value of data elements in first and second data sets, the data elements corresponding to returns from the same part of the scene and setting a detection threshold value for the comparison so as to detect targets entering said that part of scene The method provides improved target detection in the presence of clutter.

25 Claims, 3 Drawing Sheets

U.S. PATENT DOCUMENTS

| | | | |
|---|---|---|---|
| 4,595,924 A | 6/1986 | Gehman | |
| 4,633,254 A | 12/1986 | Giaccari | |
| 4,837,579 A | 6/1989 | Pease | |
| 5,745,190 A | 4/1998 | Ioka | |
| 5,847,755 A | 12/1998 | Wixson et al. | |
| 6,404,455 B1 | 6/2002 | Ito et al. | |
| 6,466,157 B1 | 10/2002 | Bjornholt et al. | |
| 2002/0060639 A1 | 5/2002 | Harman | |
| 2002/0084414 A1 | 7/2002 | Baker et al. | |
| 2006/0132354 A1 | 6/2006 | Beard | |
| 2007/0211916 A1* | 9/2007 | Smith et al. | 382/103 |

FOREIGN PATENT DOCUMENTS

| | | | |
|---|---|---|---|
| EP | 0 188 757 | | 12/1985 |
| EP | 0 528 105 | | 2/1993 |
| EP | 0 749 098 | | 12/1996 |
| GB | 2260456 | | 3/1993 |
| GB | 2337146 | | 11/1999 |
| GB | 2346752 | | 8/2002 |
| GB | 2416943 A | * | 2/2006 |
| JP | 57061968 | | 4/1982 |
| JP | 2002016907 A | * | 1/2002 |

OTHER PUBLICATIONS

Pending U.S. Appl. No. 11/918,066, filed May 27, 2005.

* cited by examiner

Fig.4.

| n |
|---|
| n+1 |
| n+2 |
| n+3 |
| n+4 |
| n+5 |
| n+6 |
| n+7 |
| n+8 |
| n+9 |
| n+10 |
| n+11 |
| n+12 |
| n+13 |
| n+14 |
| n+15 |

METHOD FOR DETECTING A TARGET

This is a Rule 371 application of PCT/GB2005/003022 filed on Aug. 2, 2005, which claims priority to Great Britain patent application no. 0417518.8, filed on Aug. 6, 2004.

BACKGROUND OF THE INVENTION (1) Field of the Invention

The invention relates to methods of detecting targets, particularly (although not exclusively) by use of a radar or similar system.

(2) Description of the Art

One application of radar systems is in the field of area monitoring, in which detection of targets within a certain area is required. For example, it may be required to detect the presence of intruders within a monitored area. Examples of radar systems suitable for performing this type of function are described in U.S. Pat. Nos. 4,595,924 and 6,466,157 and in published US patent application 2002/0 060 639.

A common problem encountered in target detection using radar is that small objects can be difficult to detect in the presence larger clutter returns. For example, intruders close to fixed objects such as building, walls, fences etc, or small objects lying on the ground (e.g. debris on a runway) may not be detected due to large clutter returns from the surrounding environment. Several methods of improving target detection by processing of radar data are known, however the amount of processing that can be done on signals from a low-cost radar system is limited.

One data processing method suitable for use with low-costs radar systems is CFAR (constant false-alarm rate) processing. In a typical implementation of CFAR processing, a rectangular window is scanned over a pixellated map of returns produced by a radar system and a detection threshold is set for each pixel in the map by reference to returns corresponding to pixels within a reference group of pixels containing a particular pixel under consideration, based on an assumed clutter distribution for the area under observation. Typical choices for the assumed clutter distribution are Rayleigh, exponential and K-distributions, or their appropriate counterparts in radar systems which generate a plurality of range profile measurements for a given range and then combine the measurements to provide within-beam integration gain.

A problem with CFAR processing performed on data corresponding to returns from radar or similar systems (e.g. lidar systems) is that high clutter returns can result in detection thresholds for some pixels (i.e. those corresponding to regions of high clutter return) being set at too high a level, resulting in some targets not being detected.

SUMMARY OF THE INVENTION

It is an object of the invention to provide an improved method of target detection suitable for use with low-cost radar systems. According to a first aspect of the present invention, this object is achieved by a method of detecting a target in a scene, characterised by the steps of:

(a) taking a first data set of data elements each of which corresponds to an average of two or more returns obtained at respective times from a part of the scene during a first time period;

(b) taking a second data set of data elements each of which corresponds to an average of one or more returns obtained at respective times from a part of the scene during a second time period subsequent to the first;

(c) generating a comparison of the value of a data element in the second data set with the value of a data element in the first data set, the data elements corresponding to returns from the same part of the scene;

(d) comparing said comparison to a threshold value so as to detect targets entering said same part of scene during the second time period and giving rise to a comparison having a value exceeding the threshold value; and (e) repeating steps (c) and (d) for data elements in the first and second data sets corresponding to returns from other parts of the scene.

Although the word "return" typically implies use of an active system, such as a radar system, in the context of this specification it should be interpreted broadly to include radiation emanating from an object irrespective of whether or not that radiation has been previously been generated elsewhere and then reflected by the object.

As the comparison in step (c) is formed from data elements corresponding to returns from the same known part of the scene, the method intrinsically provides target location in addition to target detection.

Data elements of the first data set may correspond to a fixed average return from a part of the scene so that data elements in the second data are compared against a fixed, unchanging data set. For example in the case of detecting small objects on a runway the fixed data set could correspond to returns from a runway immediately after it is swept clear of debris. Data elements of the second data second data set may each correspond to a single return from a part of the scene obtained at a specific time within the second time period so that any differences between the fixed data set and the single data set obtained in the second time period are detected. To provide a continuous monitoring function, steps (b) to (e) may be repeated at a suitable frequency.

In order to reduce false alarms caused by objects which only temporarily enter the monitored area (e.g. wild animals) data elements of the second data set may each correspond to an average of two or more returns. Increasing the number of returns used to generate the average reduces the sensitivity of the detection to occasional spurious returns. To provide a continuous monitoring function, steps (a) to (e) may be repeated at a suitable frequency in a series of cycles. False alarms may also be caused by spurious returns caused by system drift or slow changes in the environment of monitored area. The incidence of this sort of false alarm may be reduced by arranging for the first and second time periods to be consecutive time periods and the returns generated on consecutive cycles.

The particular comparison generated in step (c) is preferably chosen to be appropriate to the circumstances in which target detection is to be carried out, and may, for example, be the ratio, difference or normalised difference of data elements in the first and second data sets corresponding to returns from the same part of the scene. For example, if the first and second data sets are two-dimensional arrays of data elements having values $A_{ij}$, $B_{ij}$ respectively (corresponding to a two-dimensional monitored area) then the comparison generated in step (c) may be any of $B_{ij}/A_{ij}$, $B_{ij}-A_{ij}$ and $$\frac{B_{ij} - A_{ij}}{A^*_{ij}},$$

where $A^*_{ij}$ is the standard deviation of the values $A_{ij}$. These comparisons are respectively called the ratio, difference and normalised difference of the values $A_{ij}$, $B_{ij}$.

In the case of detecting small objects on the ground, for example debris on a runway, the ratio $B_{ij}/A_{ij}$ is appropriate for the comparison if returns from the scene are swamped by the noise floor of the system used to implement the method. If, however, the level of the noise floor of the system is below that of returns from the scene and returns from the ground and target are described by the Rice distribution, the normalised difference is an appropriate comparison.

In order to improve detection of small objects, data corresponding to a plurality of returns from an object may be combined to provide within-beam integration, for example using a Gaussian filter.

The data sets may be obtained directly from a radar, lidar or similar system for use in the method (real-time processing). Alternatively, the data sets could be written to a storage device and then obtained therefrom for subsequent use in the method (off-line processing).

Corresponding to the above method of the invention, a second aspect of the invention provides apparatus for detecting a target, the apparatus comprising processing means and a detector for detecting returns from a scene and passing corresponding signals to the processing means, characterised in that the processing means is arranged to perform a method of the invention.

The apparatus may be active as opposed to passive, in which case it comprises means for generating and detecting returns from a scene and for passing signals corresponding to detected returns to the processing means. The means for generating and detecting returns from objects and for generating signals corresponding to the returns is conveniently a radar or lidar system.

The apparatus may further comprise a camera system, with the processing means being arranged to provide the camera system with positional information relating to the position of detected target, and the camera system being arranged to produce an image of the target upon receiving that information.

By repeated use of the above method, and recording the position of an object as a function of time, an improved target tracking function is provided. If, in addition, one or more parts of the scene are each associated with a pre-defined target behaviour, one or more warning signals may be generated if one or more detected and/or tracked targets conforms to a defined target behaviour with certain parts of the scene. In this way, inferences may be made regarding the intent of targets based on their trajectories.

DESCRIPTION OF THE FIGURES

Embodiments of the invention are described below by way of example only and with reference to the accompanying drawings in which:

FIGS. 2, 3 and 4 illustrate the handling of data within the FIG. 1 system; and

DESCRIPTION OF A PREFERRED EMBODIMENT

Figure 1:
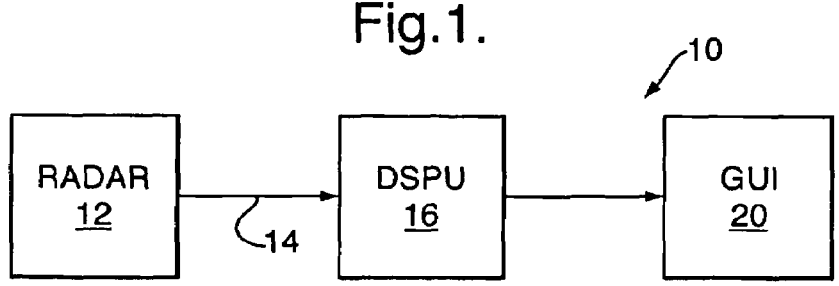
FIG. 1 is a block diagram of a radar system suitable for implementing a method of the present invention.

In FIG. 1 a standard low-cost radar system 10 suitable for monitoring a scene, or a part of a scene, comprises a main radar unit 12, a DSP unit 16 and a computer 20 running a graphical user interface (GUI) for operating the system 10 and displaying information. Data from the main radar unit 12 is processed by an FFT algorithm to produce raw data which is then passed via a wireless ethernet link 14 to a DSP unit 16. Unit 16 is programmed to carry out a method of the present invention. Processed data is passed from the DSP unit 16 to the computer 20 for display by means of the GUI. The radar unit 12 has an antenna (not shown) which may either be set to a fixed angular position or arranged to perform continuous 360° angular scanning. The beamwidth of the unit 12 is of the order of 1°. Its operating frequency is of the order of 10 GHz. The system 10 is arranged to have a sensitivity sufficient to detect walking and crawling persons, and small stationary objects within the radar beam. The antenna may be in a slightly elevated position with respect to the ground, or alternatively it may be arranged to look out horizontally.

When the system 10 is operated, individual data sets corresponding to radar returns from a scene under observation at different times are cached by the DSPU 16 in a series of memory locations in time order. When a new data set is stored, the oldest of the data sets already stored is erased, i.e. data sets are stored in the memory locations on a first in, first out basis. If the system 10 is arranged to detect objects only in a fixed direction (i.e. if the antenna if the unit 12 is in a fixed angular position), each data set corresponds to range profile data sampled by the unit 12 obtained at a particular time. Alternatively, if the antenna of the unit 12 is arranged to perform continuous 360° scanning then each data set corresponds to radar returns from the area swept out by the antenna beam during a single angular scan of the antenna. In this case, each data set comprises data elements obtained from a plurality of range profile measurements made within a single angular scan of the scene.

Figure 2:
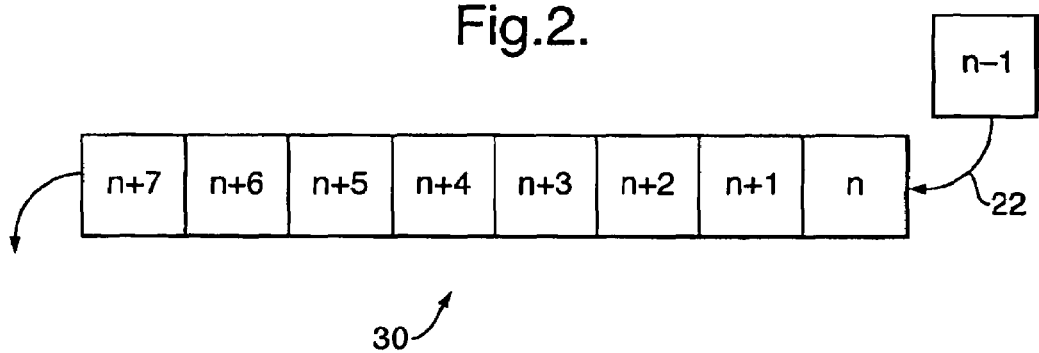
Figure 3:
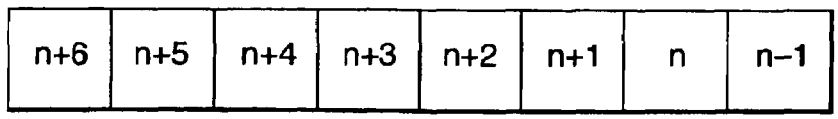

In FIG. 2, a cache of eight memory locations within the DSPU 16 is indicated generally by 30. Each location stores a respective data set. There are eight data sets n, n+1, n+2, ... n+7 arranged in time order, with n being the most recently acquired and n+7 being the oldest. When a new data set n−1 is acquired (either by processing radar returns from a fixed direction or from a complete angular scan) it is introduced into the cache in the direction of arrow 22. The existing data sets are shifted to the left, and data set n+7 is erased, so that the cache always stores the eight most recent data sets in time order, as shown in FIG. 3.

The system 10 is initially operated to collect eight data sets in the absence of targets, i.e. the eight data sets correspond only to clutter returns from the scene. These eight data sets are averaged and the resulting fixed average data set is stored in a separate memory location in the DSPU 16. When the system 10 is operated to detect targets, new data sets are continuously introduced into the cache 30 as radar returns from the scene are sampled. When a new data set is stored in the cache 30, a comparison is made with the stored fixed average data set as follows. The value of a particular data element in the new data set is divided by that of a data element in the fixed average data set, the two data elements corresponding to returns from the same part of the scene. The resulting ratio is then compared to a pre-determined threshold value to establish whether a target has entered that part of the scene. A target is detected when the ratio exceeds the threshold value. When a target is detected, a warning is displayed on the GUI. The remaining data elements in the new data set are processed likewise to provide monitoring over the whole scene. Each time a new data set is stored in the cache 30 this processing is repeated, and any targets in the scene giving rise to a sufficiently large return (i.e. in excess of the threshold value) identified as targets and suitable warning signals displayed on the GUI.

Alternatively, the eight most recent data sets may be averaged to produce a running average data set, and the running average data set compared to the fixed average set each time a new data set is stored in the cache 30, the comparison being performed as follows. The value of a data element in the running average data set is divided by that of a data element in the fixed average data set, the data elements corresponding to returns from the same part of the scene. The resulting ratio is compared to a threshold value to establish whether a target has entered that part of the scene. The remaining data elements in the running average data set are processed likewise to provide monitoring over the whole scene. This processing is carried out each time a new data set is stored in the cache 30. When a target is detected, a warning is displayed on the GUI. This method of the invention provides the advantage that targets which temporarily enter the scene for a short time (e.g. wild animals) are not normally detected as targets, thus producing fewer false alarms.

In further alternative method of the invention, target detection is achieved by comparing two running average data sets obtained in consecutive time periods. Referring to FIG. 2, the four most recent data sets n, n+1, n+2, n+3 are averaged to produce a first running average data set and data sets n+4, n+5, n+6 and n+7 are averaged to produce a second running average data set. The first running average data set is compared to the second as follows. The value of a data element in the first running average data set is divided by that of a data element in the second running average data set, the data elements corresponding to returns from the same. part of the scene. The resulting ratio is compared to a threshold value to establish whether a target has entered that part of the scene.

The remaining data elements in the first running average data set are processed likewise to provide monitoring over the whole scene. This processing is carried out each time a new data set is stored in the cache 30. When a target is detected, a warning is displayed on the GUI. This method of the invention has the advantage that false alarms due to spurious, slow changes in the running average data sets are minimised.

By averaging a greater number of data sets in any of these three methods, the system 10 can be made less sensitive to transient targets and to changes in clutter over relatively short time scales. For example if the difference of two running average data sets forms the basis of target detection, the first and second running average data sets may each be obtained by averaging eight data sets. This requires a cache having 16 memory locations, as shown in FIG. 4.

The radar unit 12 may be arranged so that a number of range profile measurements are made with the antenna (or radar beam) in the same, or substantially the same, angular position. For example, if a 2° radar beam is scanned at 2°/s the beam will illuminate a point within the scan ambit for 1 s. During this time a number of range profile measurements can be made and these can be subsequently integrated to provide within-beam integration gain.

The integration may be performed via some form of low pass filter such as a Gaussian filter. Filtering generates a set of range-angle measurements that are evenly sampled in angle, where the sample spacing is usually coarser than the raw measurement spacing. The filter is commensurate with the physical size and shape of the radar beam at the range processed and a Gaussian filter is typically suitable, although those skilled in the art may choose to vary the precise filter characteristics to suit a particular system.

The DSP unit 16 may also be arranged to record the positions of detected targets as a function time to provide a target-tracking function for moving targets. In this case, the GUI 20 may be arranged to allow visual programming of the program executed by the DSP unit 16 by a user so that warning signals are generated and displayed on the GUI if the behaviour of a target or targets conforms to certain user-defined rules. The system 10 is then able not only to detect and track targets in a monitored area, but also to make certain logical conclusions concerning a target based on its behaviour, and to raise warnings if appropriate. An example of such visual programming of the system 10 is exemplified below, with reference to FIG. 5.

Figure 5:
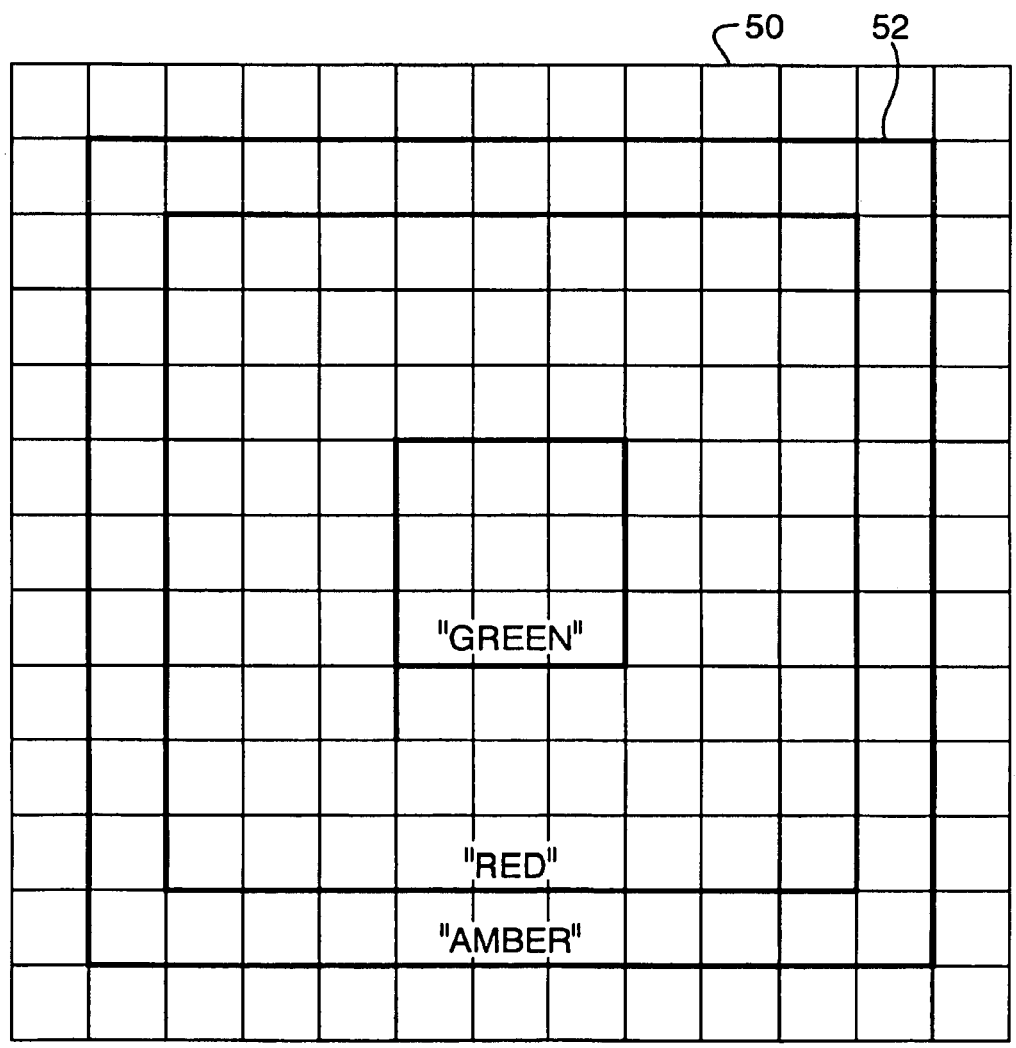
FIG. 5 illustrates extension of the functionality of a method of the present invention by visual programming.

Referring to FIG. 5, a pixellated map corresponding to a monitored area is indicated by 50. The map 50 is displayed on the GUI and is a 13×13 pixel array. The position of a closed fence within the monitored area is indicated on the map 50 by 52. Pixels lying between the position 52 of the fence and the outer edge of the monitored area may be labelled by an operator of the system 10 as an "AMBER" zone by means of the GUI. Pixels of the map 50 lying immediately inside the position 52 of the fence may be labelled as a "RED" zone by using the GUI. A portion of the monitored area corresponding to the central 3×3 pixels of the map 50 may be labelled as a "GREEN" zone, this portion of the monitored area being known to be occupied by authorised stationary and moving targets.

The GUI interacts with the program executed by the DSP unit 16 so that appropriate alarms are raised in the following cases:

1. detection of a stationary or moving object in the amber zone (potential intruder seeking entry to the fence-protected area)
2. detection of a stationary or moving object in the red zone (potential intruder has passed through or over the fence)
3. detection of a moving or stationary target in the amber zone, followed by detection of a stationary target in the red zone within a fixed subsequent period (potentially corresponding to an object being thrown over the fence).

Moving or stationary targets within the GREEN zone are ignored.

Although the foregoing relates to detection of targets using a microwave radar system, target detection and tracking according to the invention may also be carried out using millimeter-wave radar systems (operating at a frequency in the range 35 to 95 GHz for example), or lidar systems.

The invention claimed is:

1. A method of detecting a target in a scene, comprising by the steps of:
   (a) taking a first data set of data elements each of which corresponds to an average of two or more returns obtained at respective times from a part of the scene during a first time period;
   (b) taking a second data set of data elements each of which corresponds to an average of one or more returns obtained at respective times from a part of the scene during a second time period subsequent to the first;
   (c) generating a comparison of the value of a data element in the second data set with the value of a data element in the first data set, the data elements corresponding to returns from the same part of the scene;
   (d) comparing said comparison to a threshold value so as to detect targets entering said same part of scene during the second time period and giving rise to a comparison having a value exceeding the threshold value; and
   (e) repeating steps (c) and (d) for data elements in the first and second data sets corresponding to returns from other parts of the scene.

2. The method of claim 1 wherein each data element of the first data set corresponds to a fixed average return from a part of the scene.

3. The method of claim 2 wherein data elements of the second data set each correspond to a single return from a part of the scene obtained at a specific time within the second time period.

4. The method of claim 1 wherein steps (b), (c), (d) and (e) are continuously repeated.

5. The method of claim 1 wherein data elements of the second data set each correspond to an average of two or more returns.

6. The method of claim 5 wherein
   (i) the first and second time periods are consecutive time periods;
   (ii) steps (a) to (e) are continuously repeated in a series of cycles; and
   (iii) the returns are generated in consecutive cycles.

7. A method according to claim 1 wherein the comparison is a ratio, difference or normalised difference of said data element values.

8. A method according to claim 1 wherein data corresponding to a plurality of returns from an object is combined to provide within-beam integration gain.

9. The method of claim 8 wherein said data is combined using a Gaussian filter.

10. A method according to claim 1 wherein data elements of the data set correspond to data from a radar or lidar system.

11. A computer program for performing a method according to claim 1.

12. A computer programmed to perform a method according to claim 1.

13. Apparatus for detecting a target, the apparatus comprising processing means and a detector for detecting returns from a scene and passing corresponding signals to the processing means, characterised in that the processing means is arranged to perform a method according to claims 1.

14. The apparatus of claim 1 wherein the apparatus comprises means for generating and detecting returns from a scene and for passing signals corresponding to detected returns to the processing means.

15. The apparatus of claim 1 wherein the means for generating and detecting returns and for generating signals corresponding to detected returns is a radar or lidar system.

16. The apparatus of claim 13 further comprising a camera system, and wherein the processing means is arranged to output data corresponding to the position of a detected target to the camera system, which is arranged to form an image of an area of the scene containing the detected target upon receiving said data.

17. A method of tracking a target comprising the steps of
   (a) detecting and locating the target; and
   (b) recording the target's location as a function of time characterised in that step (a) is performed by a method according to claims 1.

18. The method of claim 17 further comprising the steps of
   (i) defining one or more target behaviours;
   (iii) associating each target behaviour with a part of the scene; and
   (ii) generating a warning signal if one or more detected targets conforms to a defined target behaviour associated with a part of the scene in which the target is detected and/or tracked.

19. The method of claim 18 comprising the steps of
   (i) defining first and second parts of the scene;
   (ii) generating a warning signal in the event that a moving object is detected in the first part of the scene and a stationary object is subsequently detected in the second part of the scene.

20. A computer readable medium including a computer program for performing a method according to claim 17.

21. A computer including a computer readable medium programmed to perform a method according to claim 17.

22. Apparatus for tracking a target, the apparatus comprising processing means, a detector for detecting returns from a scene and passing corresponding signals to the processing means and a data store for storing data corresponding to the position of a detected target as a function of time, characterised in that the processing means is arranged to perform a method according to claim 1.

23. The apparatus of claim 22 wherein the apparatus comprises means for generating and detecting returns from a scene and for passing signals corresponding to detected returns to the processing means.

24. The apparatus of claim 23 wherein the means for generating and detecting returns from objects in the area and for generating signals corresponding to the returns is a radar or lidar system.

25. The apparatus of claim 22 further comprising a camera system and wherein the processing means is arranged to output data corresponding to the position of a detected target to the camera system, which is arranged to form an image of the object upon receiving said data.

* * * * *